(12) United States Patent
Kashima et al.

(10) Patent No.: US 9,203,661 B2
(45) Date of Patent: Dec. 1, 2015

(54) COMMUNICATION SYSTEM

(71) Applicant: DENSO CORPORATION, Kariya, Aichi-pref. (JP)

(72) Inventors: Hideki Kashima, Kariya (JP); Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/467,203

(22) Filed: Aug. 25, 2014

(65) Prior Publication Data

US 2015/0055696 A1 Feb. 26, 2015

(30) Foreign Application Priority Data

Aug. 26, 2013 (JP) ................................. 2013-174639

(51) Int. Cl.
*H04L 25/49* (2006.01)
*H04B 3/54* (2006.01)
*H04B 14/02* (2006.01)

(52) U.S. Cl.
CPC ............ *H04L 25/4902* (2013.01); *H04B 3/542* (2013.01); *H04B 3/548* (2013.01); *H04B 14/026* (2013.01)

(58) Field of Classification Search
CPC ...... H04B 3/542; H04B 14/026; H04B 3/548; H04L 25/4902
See application file for complete search history.

(56) References Cited

U.S. PATENT DOCUMENTS

| 5,787,132 A * | 7/1998 | Kishigami et al. ............. 375/354 |
| 5,878,082 A | 3/1999 | Kishigami |
| 9,007,951 B2 * | 4/2015 | Reidl et al. ..................... 370/252 |
| 2008/0174286 A1 * | 7/2008 | Chu et al. ....................... 323/271 |
| 2012/0084378 A1 * | 4/2012 | Kaneko et al. ................. 709/208 |
| 2013/0094373 A1 * | 4/2013 | Reidl et al. ..................... 370/252 |
| 2014/0355622 A1 * | 12/2014 | Kishigami .................... 370/445 |

FOREIGN PATENT DOCUMENTS

| JP | 9-64826 A | 3/1997 |
| JP | 2013-62724 A | 4/2013 |

OTHER PUBLICATIONS

"SAE International J1850"; SAE International (2014).
Office Action mailed Jul. 7, 2015 in the corresponding Japanese patent application No. 2013-174639 (English translation attached).

* cited by examiner

*Primary Examiner* — Kenneth Lam
(74) *Attorney, Agent, or Firm* — Posz Law Group, PLC

(57) ABSTRACT

A communication system performs communication using a pulse width modulation code as a transmission code. The communication system includes a plurality of nodes that are connected via a transmission line to be capable of communicating with each other. Each of the nodes including a driver circuit. The driver circuit includes a transistor that enables and blocks conduction between the transmission line and a ground line. The plurality of nodes includes a master node and a slave node. The master node is one of the plurality of nodes. The slave node is at least one node other than the master node among the plurality of nodes. The master node includes a limiter that restricts, when the transistor of the driver circuit is turned off, changes in a conductive state of the transistor.

11 Claims, 6 Drawing Sheets

COMMUNICATION SYSTEM

CROSS-REFERENCE TO RELATED APPLICATION

This application is based on and claims the benefit of priority from Japanese Patent Application No. 2013-174639, filed Aug. 26, 2013, the disclosure of which is incorporated herein in its entirety by reference.

BACKGROUND

1. Technical Field

The present invention relates to a communication system that uses a pulse width modulation (PWM) code as a transmission code.

2. Related Art

Among communication systems that are mounted in vehicles, a system is known that uses a PWM code as a transmission code (for example, refer to SAE International J1850). Here, of the signal levels on a transmission line, a high signal level is recessive and a low signal level is dominant. The transmission line is configured so that, if even one node outputs a dominant signal, the signal level on the transmission line becomes dominant. In this instance, a configuration may be considered in which this feature is used to enable the waveform of a transmission code to be determined by the signals outputted by each node being overlapped.

In other words, a PWM code having a small low-level ratio is associated with logic 1. A PWM code having a large low-level ratio is associated with logic 0. In a bus-idle state in which no node is communicating, one (master node) of the nodes outputs a PWM code of logic 1. The nodes (slave nodes) other than the master node each output a signal that, when overlapped with the PWM code of logic 1 outputted by the master node, causes the transmission code on the transmission line to become a desired PWM code.

Specifically, for example, when a slave node outputs a PWM code of logic 1, the PWM code of logic 1 is produced by a high-level signal being outputted over the overall period of the code. In addition, when a slave node outputs a PWM code of logic 0, the PWM code of logic 0 is actualized by a signal being outputted that rewrites a portion of the PWM code of logic 1 outputted by the master node from a high signal level to a low signal level.

A driver circuit of the node is ordinarily configured using a transistor that enables and blocks conduction between a transmission line and a ground line. In other words, when the output of the own node is recessive, the node turns OFF the transistor. When the output of the own node is dominant, the node turns ON the transistor.

Therefore, when the slave node rewrites the PWM code to the PWM code of logic 0 as described above, the driver circuit of the master node switches the output thereof from a low signal level to a high signal level while the output of the driver circuit of the slave node is held at a low signal level. Then, in that instant, the current flowing to the driver circuit of the master node flows into the driver circuit of the slave node that has rewritten the code (in other words, that is outputting the low signal level). As a result of the sudden change in current, a problem occurs in that significant noise is generated.

SUMMARY

It is thus desired to suppress the generation of noise in a communication system that uses a pulse width modulation code as a transmission code.

An exemplary embodiment provides a communication system for performing communication using a pulse width modulation code as a transmission code. The communication system includes a plurality of nodes that are connected via a transmission line to be capable of communicating with each other. Each of the plurality of nodes includes a driver circuit that includes a transistor that enables and blocks conduction between a transmission line and a ground line. The plurality of nodes include a master node and a slave node. The master node is one of the plurality of nodes. The slave node is at least one node other than the master node among the plurality of nodes. The master node includes a limiter (or limiting means) that restricts, when the transistor of the driver circuit is turned off, changes in a conductive state of the transistor.

In other words, the transistor of the driver circuit in the master node does not instantly change from an ON state to an OFF state. Rather, the conductive state of the transistor gradually changes from the ON state to the OFF state.

Therefore, when the transistor in the slave node is in the ON state (the signal level of the transmission line is low), if the transistor in the master node is turned off, the current flowing to the master node gradually decreases. In a complementary manner, the current flowing to the slave node gradually increases. Therefore, the generation of noise caused by a sudden increase in the current flowing to the slave node can be suppressed.

Reference numbers enclosed in parentheses in the scope of claims indicate correlations with specific means described in the embodiments that are given hereafter as examples. The reference numbers do not limit the technical scope of the present invention.

DESCRIPTION OF EMBODIMENTS

Embodiments of the present invention will hereinafter be described with reference to the drawings.

First Embodiment

Figure 1:
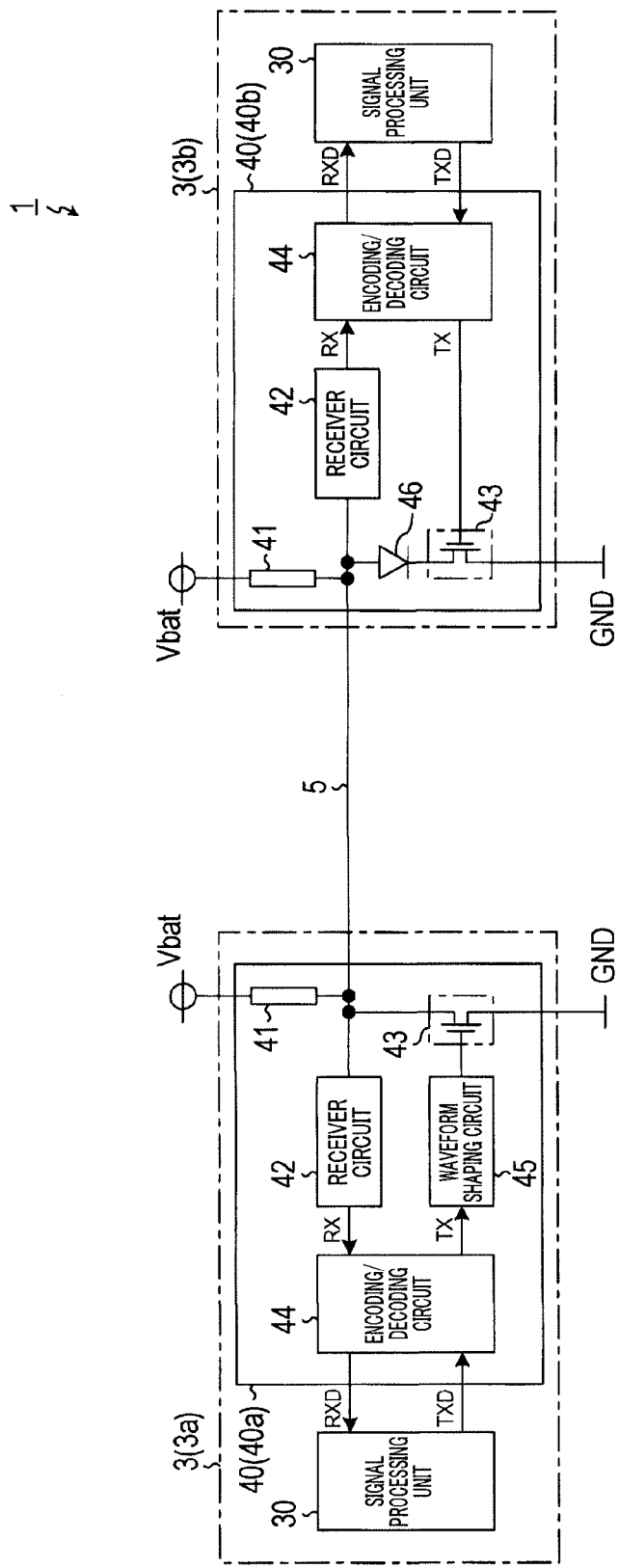
FIG. 1 is an overall configuration diagram of an in-vehicle communication system according to a first embodiment.

FIG. 1 shows an in-vehicle communication system 1 to which the present invention is applied. In the in-vehicle communication system 1, a plurality (two in FIG. 1) of electronic control units (ECUs) 3 are mounted in a vehicle. The ECUs 3 are connected by a bus-like transmission line 5 to be capable of communicating with each other. The ECU 3 is hereinafter referred to as a "node 3".

The transmission line 5 is configured so that, when a high-level (recessive) signal and a low-level (dominant) signal are simultaneously outputted from different nodes 3, the signal level on the transmission line 5 becomes low. Bus arbitration is performed using this function.

Figure 2:
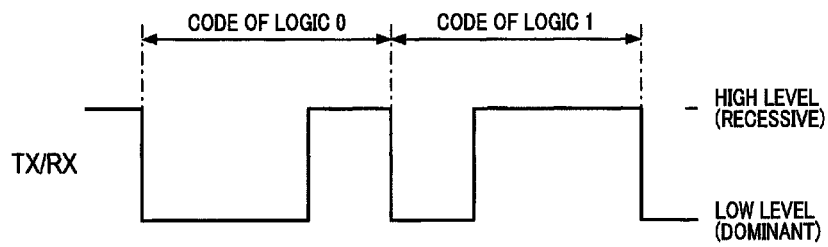
FIG. 2 is an explanatory diagram of a transmission code.

As shown in FIG. 2, a PWM code is used as a transmission code on the transmission line 5. In the PWM code, the signal level changes from high to low at bit borders. The signal level also changes from low to high during the bit. Binary signals (logic 0/logic 1) are expressed by two codes having differing duty ratios. Hereafter, the code having a longer low-level ratio (duration period) is a code of logic 0, and the code having a shorter low-level ratio is referred to as a code of logic 1.

Specifically, in the code of logic 0, the signal level is set to low during a two-third period of a single bit. The signal level is then set to high during a one-third period of the bit. In addition, in the code of logic 1, the signal level is set to low during a one-third period of a single bit. The signal level is then set to high during a two-third period of the bit. Therefore, when a code of logic 0 and a code of logic 1 collide on the transmission line 5, the code of logic 0 wins the arbitration. In other words, a waveform formed by the waveforms of the signals outputted by the nodes (ECUs) 3 being overlapped serves as the waveform of the transmission code on the transmission line 5.

Among the nodes 3, one node 3 functions as a master node (referred to, hereafter, as simply a "master") 3a. The master node 3a controls overall communication. All other nodes 3 function as slave nodes (referred to, hereinafter, as simply "slaves"). At least a so-called polling master/slave communication is actualized.

As shown in FIG. 1, the node 3 includes a signal processing unit 30 and a transceiver 40. The signal processing unit 30 performs various processes assigned to the own node 3 based on information and the like acquired through communication with other nodes 3 over the transmission line 5. The transceiver 40 encodes transmission data supplied from the signal processing unit 30 and sends the encoded transmission data to the transmission line 5. In addition, the transceiver 40 receives signals from the transmission line 5 and supplies the signal processing unit 30 with decoded reception data.

The signal processing unit 30 is composed of a well-known microcomputer. The signal processing unit 30 is well-known. The signal processing unit 30 actualizes serial data transmission and reception via the transceiver 40 using a UART function that actualizes start-stop (asynchronous) serial communication. Specifically, the signal processing unit 30 of the master 3a periodically transmits a header that successively designates data of which transmission is permitted (as well as the slave 3b to serve as the transmission source of the data). The signal processing unit 30 of the slave 3b serving as the transmission source of the data designated by the header returns a response after the header.

The configuration of the transceiver 40 differs in part between the master 3a and the slave 3b. Therefore, the transceiver 40 of the master 3a and the transceiver 40 of the slave 3b will be described separately. Hereafter, the transceiver 40 of the master 3a is referred to as a "master-side transceiver 40a". The transceiver 40 of the slave 3b is referred to as a "slave-side transceiver 40b".

The master-side transceiver 40a includes a resistor 41, a receiver circuit 42, a driver circuit 43, an encoding/decoding circuit 44, and a waveform shaping circuit (corresponding to a limiter or limiting means) 45. The resistor 41 pulls up the transmission line 5 to a power supply voltage (battery voltage) Vbat. The receiver circuit 42 receives signals from the transmission line 5. The driver circuit 43 transmits signals to the transmission line 5. The encoding/decoding circuit 44 encodes NRZ-code transmission data TXD supplied from the signal processing unit 30 to a PWM code. The encoding/decoding circuit 44 also decodes reception data RX received by the receiver circuit 42 to a NRZ code and supplies the NRZ code to the signal processing unit 30. The waveform shaping circuit 45 shapes the waveform of the encoded transmission data TX generated by the encoding/decoding circuit 44. The waveform shaping circuit 45 then supplies the transmission data TX to the driver circuit 43.

Among the above-described components, the resistor 41 and the receiver circuit 42 are well known. Therefore, descriptions thereof are omitted.

Figure 3A:
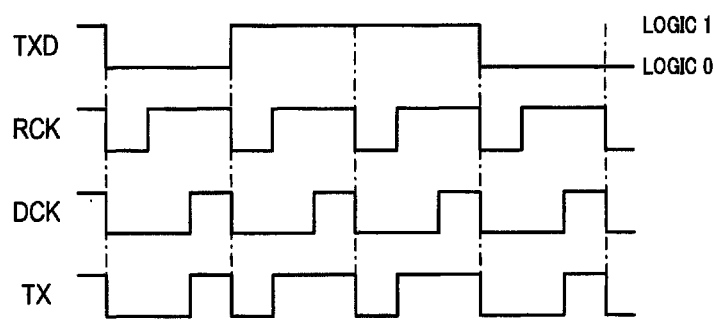
FIG. 3A and FIG. 3B are timing charts of an encoding operation by an encoding/decoding circuit shown in FIG. 1.

The encoding/decoding circuit 44 operates as shown in FIG. 3A based on a reference clock. The reference clock is generated within the master 3a. In other words, based on the reference clock, the encoding/decoding circuit 44 generates a clock RCK that is set to the same duty ratio as the code of logic 1 and a clock DCK that is set to the same duty ratio as the code of logic 0.

When the transmission data TXD supplied from the signal processing unit 30 is logic 1, the encoding/decoding circuit 44 selects the clock RCK. When the transmission data TXD supplied from the signal processing unit 30 is logic 0, the encoding/decoding circuit 44 selects the clock DCK. The encoding/decoding circuit 44 then outputs signals selected based on the transmission data TXD as encoded transmission data TX. However, when the transmission data TXD is not supplied from the signal processing unit 30, the encoding/decoding circuit 44 selects and continuously outputs the clock RCK (in other words, the code of logic 1). Hereafter, the signal is also referred to as a "master-transmitted clock".

On the other hand, during decoding, for example, the encoding/decoding circuit 44 measures the duration of the low signal level of the reception data RX supplied by the receiver circuit 41. Based on the measurement result, the encoding/decoding circuit 44 determines whether the reception data RX is the code of logic 1 or the code of logic 0. As a result, the encoding/decoding circuit 44 generates decoded reception data RXD. A threshold used to determine whether or not the signal level of the reception data RX is low is referred to as a low-level determination threshold THd. A threshold used to determine whether or not the signal level of the reception data RX is high is referred to as a high-level determination threshold THr. According to the first embodiment, the low-level determination threshold THd is set to 30% of the power supply voltage Vbat. The high-level determination threshold THr is set to 70% of the power supply voltage Vbat.

The driver circuit 43 is composed of a field effect transistor that enables/blocks conduction between the transmission line 5 and a ground line GND. Hereafter, the driver circuit 43 is also simply referred to as a transistor 43. However, the driver circuit 43 is not limited to the field effect transistor, and may be a bipolar transistor, an insulated-gate bipolar transistor (IGBT), or the like.

Figure 4:
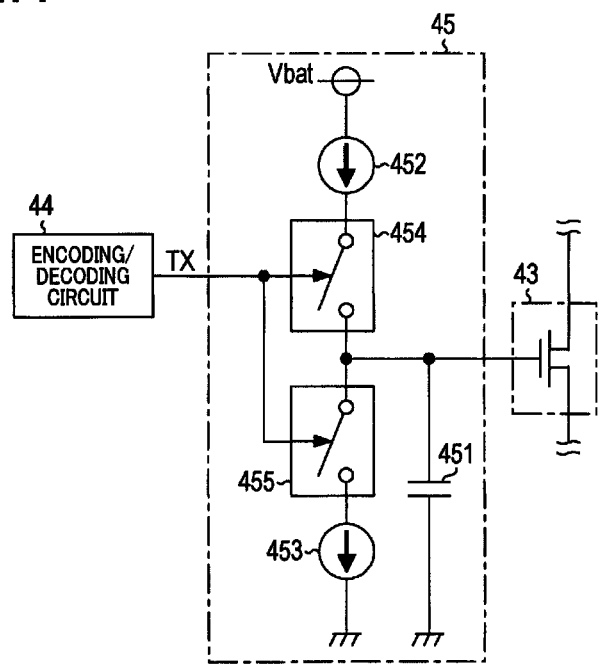
FIG. 4 is a circuit diagram of a configuration of a waveform shaping circuit shown in FIG. 1.

As shown in FIG. 4, the waveform shaping circuit 45 includes a capacitor 451, a charge-side constant current circuit 452, a discharge-side constant current circuit 453, a charge-side switch 454, and a discharge-side switch 455.

The capacitor 451 is connected between the gate (control terminal) of the transistor 43 and the ground line GND. The charge-side constant current circuit 452 restricts the charge current of the capacitor 451 to a certain amount. The discharge-side constant current circuit 453 restricts the discharge current of the transistor 43 to a certain amount. The charge-side switch 454 enables and blocks conduction between the charge-side constant current circuit 452 and the gate of the transistor 43 based on the encoded transmission data TX. The discharge-side switch 455 enables and blocks conduction between the gate of the transistor 43 and the discharge-side constant current circuit 453.

Figure 5:
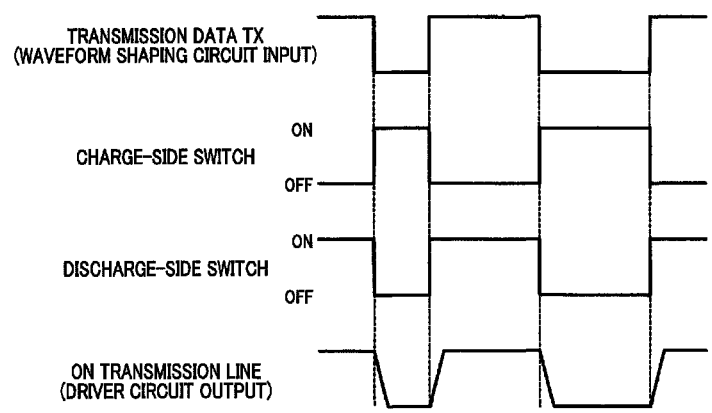
FIG. 5 is a timing chart of an operation of the waveform shaping circuit shown in FIG. 4.

As shown in FIG. 5, the charge-side switch 454 is turned ON when the transmission data TX is at the low signal level. The charge-side switch 454 is turned OFF when the transmission data TX is at the high signal level. Conversely, the discharge-side switch 455 is turned ON when the transmission data TXD is at the low signal level. The discharge-side switch 455 is turned OFF when the transmission data TXD is at the high signal level.

In the waveform shaping circuit 45 configured as described above, when the transmission data TX changes from the high signal level to the low signal level, the charge-side switch 454 switches from OFF to ON. In addition, the discharge-side switch 455 switches from ON to OFF. The capacitor 451 is then charged at a certain rate by the constant current sent by the charge-side constant current circuit 452, until the power supply voltage Vbat is reached.

Therefore, the transistor 43 changes gradually, rather than instantly, to a conductive state in which a large current can be sent (a completely ON state). As a result, the signal level of the transmission line 5 also gradually changes from high to low in accompaniment with the change in the conductive state of the transistor 43. This change becomes more gradual as the constant current sent by the charge-side constant current circuit 452 becomes smaller.

In addition, when the transmission data TX changes from the low signal level to the high signal level, the charge-side switch 454 switches from ON to OFF. In addition, the discharge-side switch 455 switches from OFF to ON. The capacitor 451 is then discharged at a certain rate by the constant current sent by the discharge-side constant current circuit 453, until ground level is reached.

Therefore, the transistor 43 changes gradually, rather than instantly, to a conductive state in which the current is blocked (a completely OFF state). As a result, the bus potential also gradually changes from low to high in accompaniment with the change in the conductive state of the transistor 43. This change becomes more gradual as the constant current sent by the discharge-side constant current circuit 453 becomes smaller.

As shown in FIG. 1, in the slave-side transceiver 40b, the waveform shaping circuit 45 that is provided in the master-side transceiver 40a is omitted. The slave-side transceiver 40b is configured so that the encoded transmission data TX outputted from the encoding/decoding circuit 44 is directly applied to the gate of the transistor 43. In addition, a diode (corresponding to a level shifter or level shifting means) 46 is connected between the transmission line 5 and the transistor 43. In the diode 46, the direction from the transmission line 5 towards the ground line GND is the forward direction. The position in which the diode 46 is connected is not limited thereto, and may be between the transistor 43 and the ground line GND.

Figure 3B:
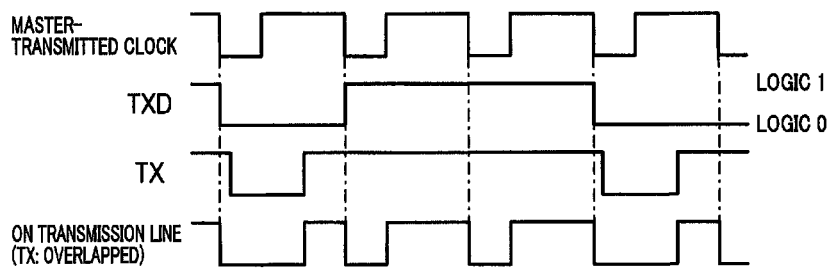

The encoding/decoding circuit 44 of the slave 3b extracts a clock component (master-transmitted clock) that is included in the signal received from the transmission line 5. The encoding/decoding circuit 44 then operates as shown in FIG. 3B, based on the clock component. In other words, when the transmission data TXD supplied from the signal processing unit 30 is logic 1, the encoding/decoding circuit 44 outputs a signal that is at the high signal level over the overall period of a single bit as the encoded transmission data TX.

In addition, when the transmission data TXD is logic 0, the encoding/decoding circuit 44 outputs a following signal as the encoded transmission data TX. That is, when a falling edge of the reception data RX is detected, the signal changes to the low signal level at a timing that is delayed by a predetermined period. The signal then changes to the high signal level at a timing that is the elapse of the duration of the low signal level in the code of logic 0, from the detected falling edge. The transmission data TX that has a waveform such as this is combined with the master-transmitted clock on the transmission line 5. As a result, the waveform of the code of logic 1 or the code of logic 0 shown in FIG. 2 is formed.

In the slave-side transceiver 40b configured as described above, a potential (referred to, hereinafter, as a "slave low potential") Vsl of the transmission line 5 when the transistor 43 is ON, or in other words, when the slave 3b is outputting the low signal level, becomes higher than the potential of the ground line GND by an amount equivalent to a forward voltage Vf of the diode 46. As a result, when the master 3a and the slave 3b simultaneously output the low signal level, the current flows into the master 3a that has the lower potential. The slave low potential Vsl is set such that the relationship with the low-level determination threshold THd is Vsl<THd.

Here, an instance in which the master node 3a outputs the code of logic 1 and the slave node 3b outputs the code of logic 0 will be described.

Figure 6:
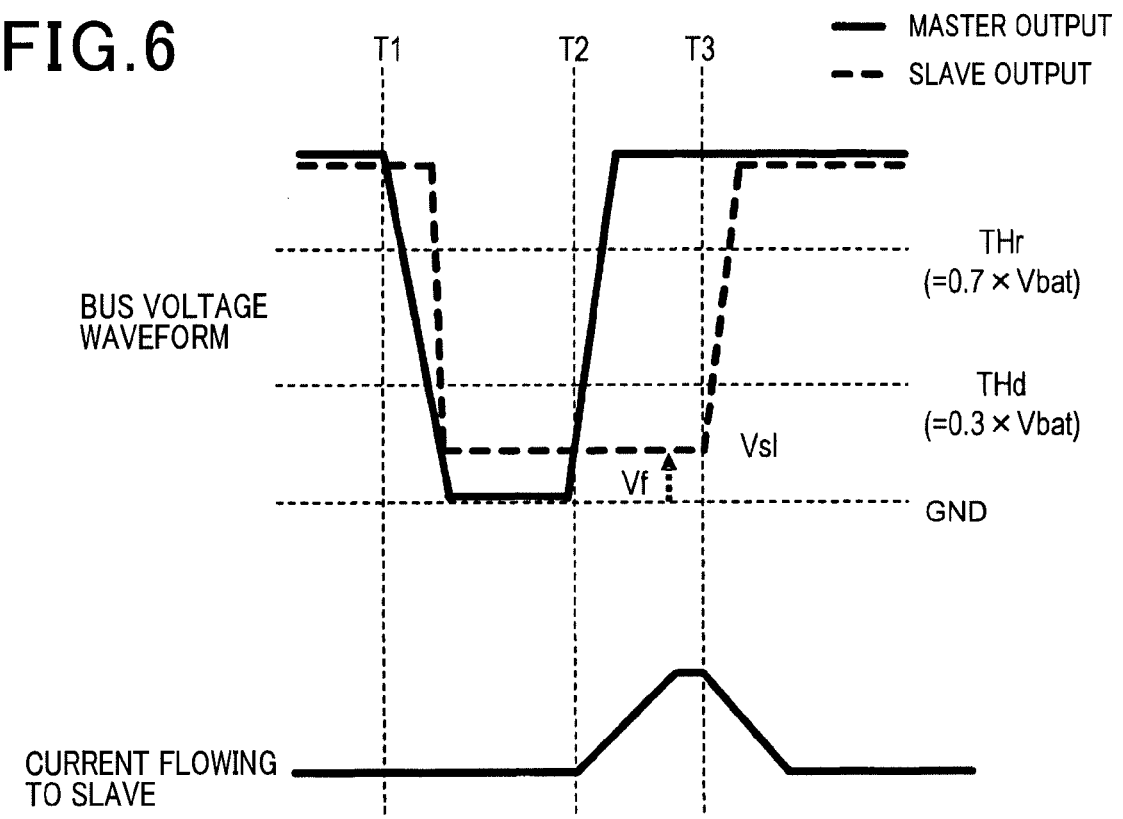
FIG. 6 is an explanatory diagram of master and slave output waveforms and changes in a current that flows to the slave.

As shown in FIG. 6, the waveform of the signal (master output) outputted from the master 3a to the transmission line 5 is such that, as a result of the function of the waveform shaping circuit 45, the falling edge and the rising edge are both more gradual compared to the waveform of the signal (slave output) outputted from the slave 3b to the transmission line 5. The potential when the transistor 43 is completely ON is substantially equal to the potential of the ground line GND.

On the other hand, the waveform of the slave output is such that the signal level falls later than in the master output. The potential (slave low potential Vsl) when the transistor 43 is conducting at maximum is higher than the potential of the ground line GND by an amount equivalent to the forward voltage Vf of the diode 46.

The signal level rises at a timing that is at one-third of a single bit in the master output and at two-thirds of a single bit in the slave output.

When the master output and the slave output such as those described above are combined on the transmission line 5, the waveform that has the lower signal level is given priority. Therefore, from when the master output falls (time T1) until when the master output rises and exceeds the slave low potential Vsl (time T2), the waveform of the signal outputted from the master 3a (the waveform indicated by the solid line in FIG. 6) is prioritized. Subsequently, the waveform of the signal outputted from the slave 3b (the waveform indicated by the dotted line in FIG. 6) is prioritized. As a result, a waveform indicating the code of logic 0 is formed.

Then, from time T1 to time T2, the current on the transmission line 5 flows to the master 3a that has the lower potential. The current flowing to the slave 3b becomes zero. When time T2 passes, the transistor 43 of the master 3a is turned OFF. However, the current flowing to the master 3a does not immediately become zero. Rather, the current gradually decreases in accompaniment with the gradual decrease in the gate potential (potential of the control terminal) of the transistor 43. In a complementary manner, the current flowing to the slave 3b gradually increases. When the current reaches a certain amount determined by the resistor 41, the power supply voltage Vbat, and the slave low potential Vsl, the current remains at this certain amount. After time T3 when the transistor 43 of the slave 3b is turned OFF, the current flowing to the slave 3b decreases until zero is reached.

For comparison, an instance in which the waveform shaping circuit 45 of the master 3a and the diode 46 of the slave 3b are omitted will be described.

Figure 7:
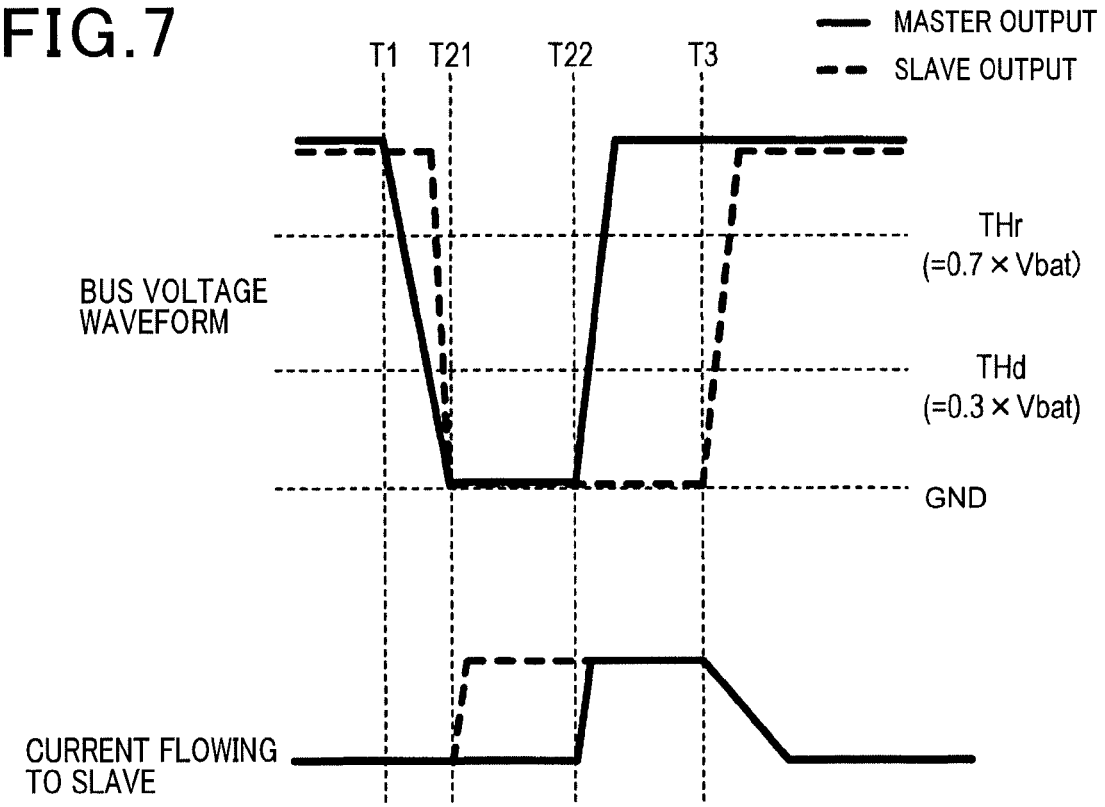
FIG. 7 is an explanatory diagram of the master and slave output waveforms and the changes in the current that flows to the slave, in a comparison example in which the waveform shaping circuit and a diode are omitted.

As shown in FIG. 7, because the waveform shaping circuit 45 is omitted, the waveform of the master output is such that the falling edge and the rising edge both have sharp slopes similar to those in the waveform of the slave output. The potential when the transistor 43 is conducting at maximum is substantially the same as the potential of the ground line GND for both the master output and the slave output.

Therefore, during the period after the master output and the slave output both fall (time T21) until the master output rises (time T22), it is uncertain whether the current on the transmission line 5 flows to the master 3a or the slave 3b. Here, it is assumed that all of the current flows to the master 3a and the current flowing to the slave 3b is zero.

When time T22 passes, the transistor 43 of the master 3a is immediately turned OFF. Therefore, the current flowing to the master 3a suddenly decreases. In a complementary manner, the current flowing to the slave 3b suddenly increases. The sudden increase in the in-flowing current causes noise to be generated. The subsequent operation is similar to that described with reference to FIG. 6 above.

If the potential of the slave 3b when the transistors 43 of both the master 3a and the slave 3b are ON is even slightly greater than the potential of the master 3a, the current flowing to the slave 3b suddenly increases at the timing at which the potential of the slave output that falls later than the master output becomes lower than the potential of the master output (time T21). This sudden increase causes noise to be generated.

As described above, in the in-vehicle communication system 1, the slave 3b is provided with the diode 46. As a result, when the transistors (driver circuits) 43 of both the master 3a and the slave 3b are turned ON, the current flowing to the slave 3b becomes zero. All of the current on the transmission line 5 flows into the master 3a.

Furthermore, in the communication system 1, the waveform shaping circuit 45 of the master 3a is provided. As a result, when the transistor 43 of the master 3a is turned OFF from a state in which the transistors (driver circuits) 43 of both the master 3a and the slave 3b are turned ON, a sudden decrease in the current flowing to the master 3a and a sudden increase in the current flowing to the slave 3b can be suppressed.

Therefore, according to the in-vehicle communication system 1, the generation of noise caused by a sudden increase in the current flowing to the slave 3b can be suppressed.

Second Embodiment

Next, a second embodiment will be described below.

According to the second embodiment, the basic configuration is similar to that according to the first embodiment. Therefore, descriptions of common configurations are omitted. Differences will mainly be described.

According to the first embodiment, the waveform shaping circuit 45 changes the gate potential (as well as the slope of the edge in the waveform on the transmission line 5) at a predetermined rate. On the other hand, the second embodiment differs from the first embodiment in that the gate potential is changed depending on the signal level on the transmission line 5.

Figure 8:
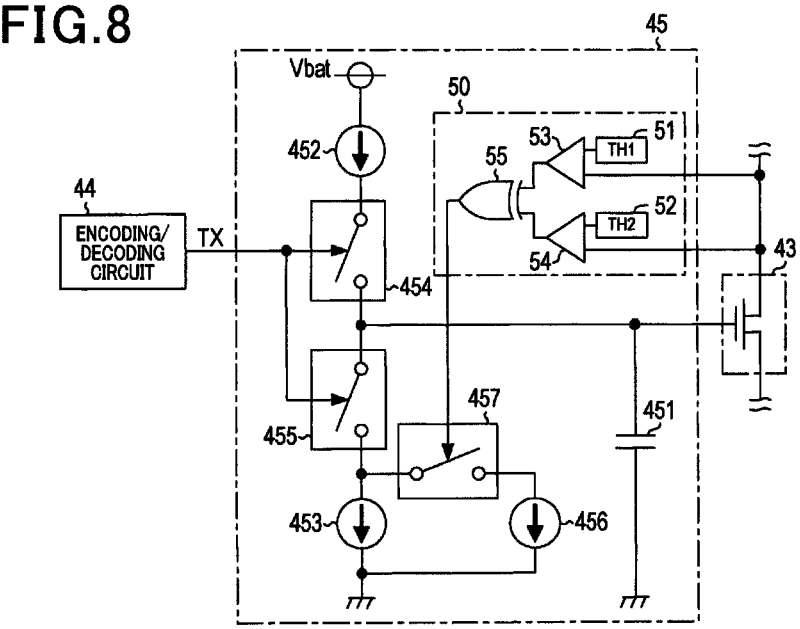
FIG. 8 is a circuit diagram of a configuration of a waveform shaping circuit according to a second embodiment.

As shown in FIG. 8, the waveform shaping circuit 45 according to the second embodiment includes, in addition to the configuration described according to the first embodiment, an additional constant current circuit 456, an additional switch 457, and a signal generating unit 50.

The additional constant current circuit 456 is provided in series with the discharge-side constant current circuit 453. The additional switch 457 enables and blocks conduction between the additional constant current circuit 456 and the discharge-side switch 455 based on control signals generated by the signal generating unit 50. As a result, the discharge current of the capacitor 451 is increased or decreased.

The signal generating unit 50 includes an upper threshold generating circuit 51, a lower threshold generating circuit 52, a comparator 53, a comparator 54, and an exclusive OR (XOR) circuit 55.

The upper threshold generating circuit 51 generates an upper threshold TH1 that is set higher than the high-level determination threshold THr. The lower threshold generating circuit 52 generates a lower threshold TH2 that is set lower than the low-level determination threshold THd and higher than the slave low potential Vsl. The comparator 53 outputs a high signal level when the signal level of the transmission line 5 is higher than the upper threshold TH1. The comparator 54 outputs a high signal level when the signal level of the transmission line 5 is higher than the lower threshold TH2. The XOR circuit 55 outputs a high signal level when the outputs from the comparators 53 and 54 do not match. The signal generating unit 50 supplies the output from the XOR circuit 55 as the control signal of the additional switch 457.

The additional switch 457 is set to OFF when the control signal is at the low signal level, or in other words, when the signal level of the transmission line 5 is higher than the upper threshold TH1 or lower than the lower threshold TH2. In addition, the additional switch 457 is set to ON when the control signal is at the high signal level, or in other words, the signal level of the transmission line 5 is the upper threshold TH1 or lower and the lower threshold TH2 or higher. For example, the upper threshold TH1 may be set to 80% of the power supply voltage Vbat. The lower threshold TH2 may be set to 20% of the power supply voltage Vbat.

Figure 9:
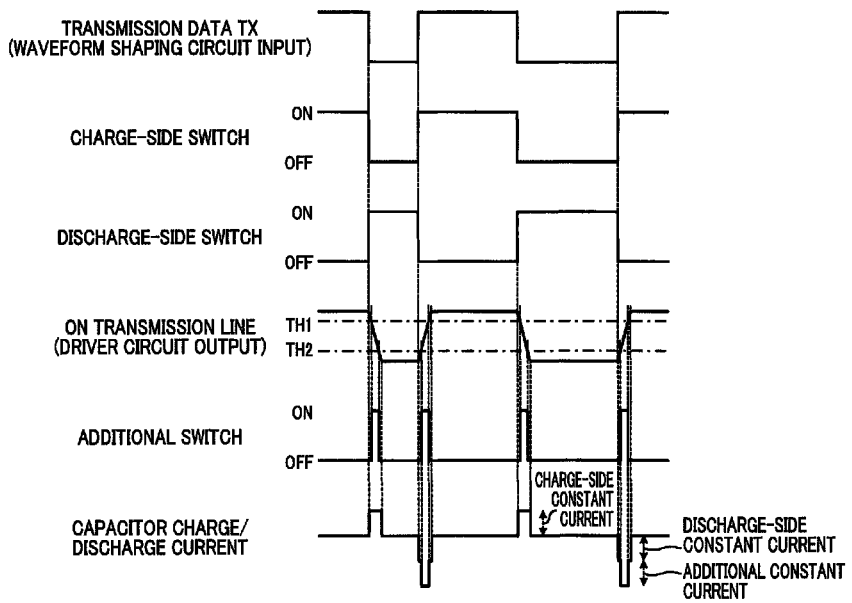
FIG. 9 is a timing chart of an operation of the waveform shaping circuit shown in FIG. 8.

In other words, as shown in FIG. 9, the additional switch 457 is turned ON during a transition period when the signal level on the transmission line 5 changes. The additional switch 457 is turned OFF at other times. However, the discharge-side constant current circuit 453 and the additional constant current circuit 456 operate effectively only when the transmission data TX is at the high signal level at which the discharge-side switch 455 is turned ON. Therefore, when the signal level on the transmission line 5 rises, the discharge current increases only while the signal level is between the lower threshold TH2 and the upper threshold TH1.

Figure 10A:
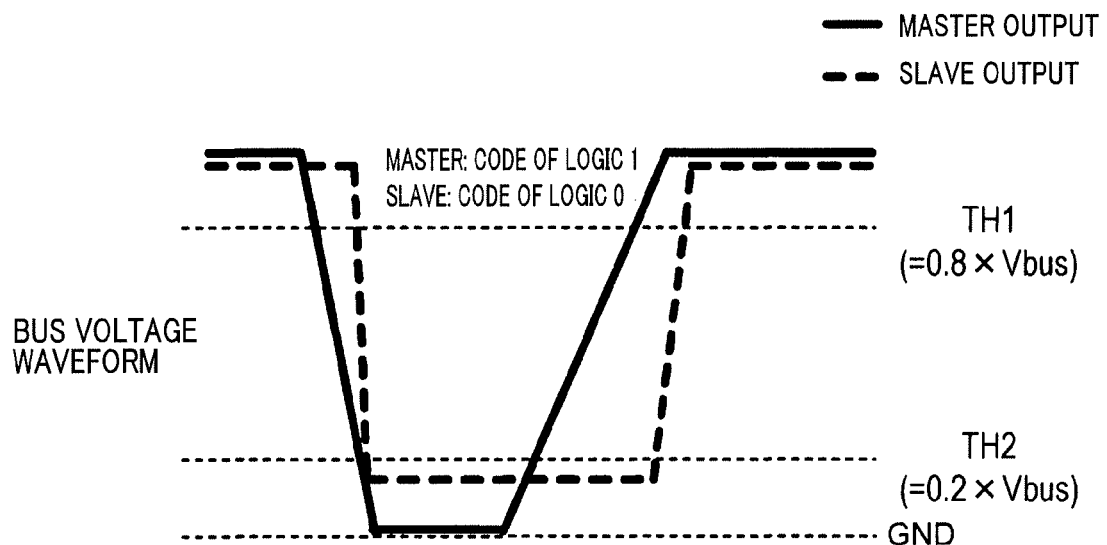
FIGS. 10A and 10B are an explanatory diagram of master and slave output waveforms according to the second embodiment.

When the master output is the code of logic 1 and the slave output is the code of logic 0, as shown in FIG. 10A, at the rising edge of the master output, the slave output is prioritized in the signal level on the transmission line 5. In this instance, the signal level on the transmission line 5 (=the slave output) is lower than the lower threshold TH2. Therefore, the additional switch 457 remains OFF.

Figure 10B:
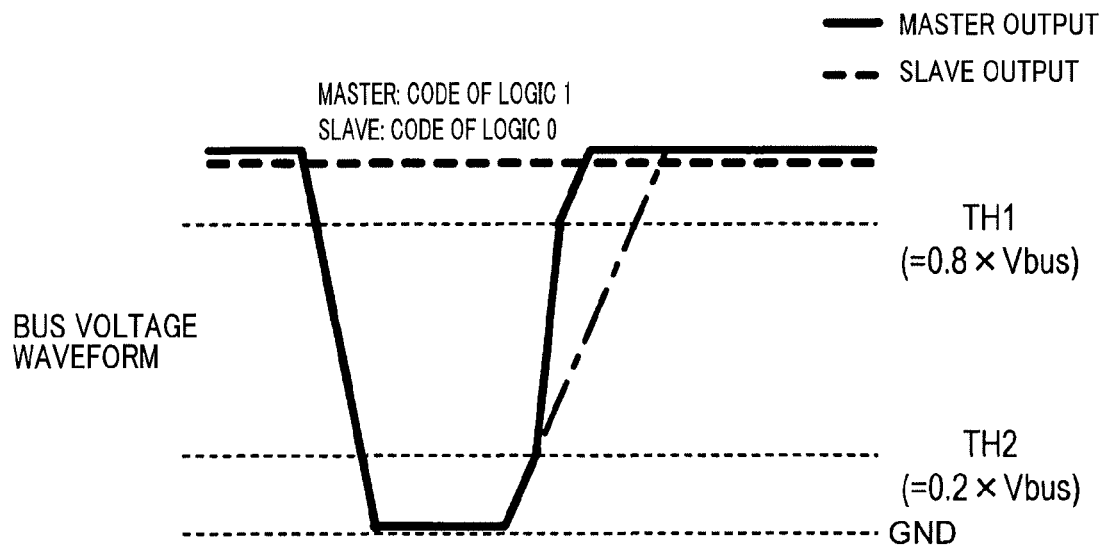

On the other hand, when the master output and the slave output are both code of logic 1s, as shown in FIG. 10B, the master output is prioritized at all times in the signal level on the transmission line 5. Therefore, when the master output rises, only the discharge-side constant current circuit 453 operates effectively until the signal level on the transmission line 5 (=the master output) reaches the lower threshold TH2.

Therefore, the signal level gradually increases. Until the signal level exceeds the lower threshold TH2 and reaches the upper threshold TH2, the discharge-side constant current circuit 453 and the additional constant current circuit 456 both operate effectively. Therefore, the signal level suddenly increases. When the signal level exceeds the upper threshold TH2, only the discharge-side constant current circuit 453 operates effectively, once again. Therefore, the signal level gradually increases.

According to the second embodiment, effects similar to those according to the first embodiment are achieved. In addition, according to the second embodiment, as a result of the operation of the additional constant current circuit 456, the time required for the rising edge in the waveform on the transmission line 5 to reach the high-level determination threshold THr is shortened. Therefore, a low-level period or a high-level period required for determination of the code of logic 1 and the code of logic 0 can be sufficiently ensured.

Other Embodiments

The embodiments are described above, but the present invention is not limited to the above-described embodiments. Various embodiments may be also possible.

(1) According to the above-described embodiments, the diode 46 is used as a level shifting means for making the slave low potential Vsl higher than the ground potential. However, this is not limited thereto. For example, a resistor may be used.

(2) According to the above-described embodiments, an instance is described in which the present invention is applied to an in-vehicle communication system. However, this is not limited thereto. The present invention may be applied to other communication systems.

(3) The constituent elements of the present invention are conceptual and are not limited to those according to the above-described embodiments. For example, the functions of one constituent element may be dispersed among a plurality of constituent elements. Alternatively, the functions of a plurality of constituent elements may be integrated into a single constituent element. In addition, at least some of the configurations according to the above-described embodiments may be replaced by known configurations having similar functions. In addition, at least some of the configurations according to any of the above-described embodiments may be added to or replaced by configurations in another of the above-described embodiments.

What is claimed is:

1. A communication system for performing communication using a pulse width modulation code as a transmission code, the communication system comprising:
   a plurality of nodes that are connected via a transmission line to be capable of communicating with each other, each of the nodes including a driver circuit comprising a transistor that enables and blocks conduction between the transmission line and a ground line,
   the plurality of nodes comprising:
      a master node that is one of the plurality of nodes; and
      a slave node that is at least one node other than the master node among the plurality of nodes,
      the master node comprising
         a limiter that restricts, when the transistor of the driver circuit is turned off, changes in a conductive state of the transistor, wherein
      the slave node comprises
         a level shifter that is disposed between the transmission line and the ground line, and makes a first signal level higher than a second signal level where the first signal level is a signal level of the transmission line when the transistor of the driver circuit is turned on and the second signal level is a signal level of the transmission line when the transistor of the driver circuit of the master node is turned on.

2. The communication system according to claim 1, wherein
   the level shifter comprises a diode that is connected between the transmission line and the ground line in such a manner that a forward direction of the diode is a direction from the transmission line towards the ground line.

3. The communication system according to claim 2, wherein
   the limiter restricts a current flowing in and out of a control terminal of the transistor of the driver circuit such that a potential of the control terminal changes at a predetermined rate.

4. The communication system according to claim 3, wherein
   the limiter restricts changes in the conductive state of the transistor of the driver circuit when the signal level of the transmission line is lower than a lower threshold that is set to be lower than a low-level determination threshold that is a threshold used for determining whether or not a signal level of the transmission line is a low level.

5. The communication system according to claim 4, wherein
   the limiter is a waveform shaping circuit,
   the waveform shaping circuit comprising:
      a capacitor that is connected between a control terminal of the transistor of the driver circuit and the ground line;
      a charge-side constant current circuit that restricts a charge current of the capacitor;
      a discharge-side constant current circuit that restricts a discharge current of the transistor of the driver circuit;
      a charge-side switch that enables and blocks conduction between the charge-side constant current circuit and the control terminal of the transistor of the driver circuit based on encoded transmission data; and
      a discharge-side switch that enables and blocks conduction between the control terminal of the transistor of the driver circuit and the discharge-side constant current circuit.

6. The communication system according to claim 5, wherein
   the waveform shaping circuit further comprises:
      a signal generating unit that generates control signals;
      an additional constant current circuit that is proposed in series with the discharge-side constant current circuit; and
      an additional switch that enables and blocks conduction between the additional constant current circuit and the discharge-side switch based on the control signals generated by the signal generating unit,
   the signal generating unit comprising:
      an upper threshold generating circuit that generates an upper threshold that is set higher than a high-level determination threshold;
      a lower threshold generating circuit that generates a lower threshold that is set lower than the low-level determination threshold and higher than a slave low potential;

a first comparator that outputs a high signal level when the signal level of the transmission line is higher than the upper threshold;

a second comparator that outputs a high signal level when the signal level of the transmission line is higher than the lower threshold; and an exclusive OR circuit that outputs, as the control signal of the additional switch, a high signal level when the output from the first comparator and the output from the second comparator do not match, the additional switch being is set to be turned off when the signal level of the transmission line is higher than the upper threshold or lower than the lower threshold, the additional switch being is set to be turned on when the signal level of the transmission line is the upper threshold or lower and the lower threshold or higher.

7. The communication system according to claim 2, wherein the limiter restricts changes in the conductive state of the transistor of the driver circuit when the signal level of the transmission line is lower than a lower threshold that is set to be lower than a low-level determination threshold that is a threshold used for determining whether or not a signal level of the transmission line is a low level.

8. The communication system according to claim 1, wherein the limiter restricts a current flowing in and out of a control terminal of the transistor of the driver circuit such that a potential of the control terminal changes at a predetermined rate.

9. The communication system according to claim 8, wherein the limiter restricts changes in the conductive state of the transistor of the driver circuit when the signal level of the transmission line is lower than a lower threshold that is set to be lower than a low-level determination threshold that is a threshold used for determining whether or not a signal level of the transmission line is a low level.

10. The communication system according to claim 1, wherein the limiter restricts changes in the conductive state of the transistor of the driver circuit when the signal level of the transmission line is lower than a lower threshold that is set to be lower than a low-level determination threshold that is a threshold used for determining whether or not a signal level of the transmission line is a low level.

11. The communication system according to claim 1, wherein the plurality of nodes are a plurality of electronic control units that are mounted in a vehicle.

\* \* \* \* \*